United States Patent
Nunes et al.

(10) Patent No.: US 11,336,673 B2
(45) Date of Patent: May 17, 2022

(54) SYSTEMS AND METHODS FOR THIRD PARTY RISK ASSESSMENT

(71) Applicants: Eric Nunes, Tempe, AZ (US); Krishna Dharaiya, Tempe, AZ (US); Jana Shakarian, Tempe, AZ (US); Paulo Shakarian, Tempe, AZ (US)

(72) Inventors: Eric Nunes, Tempe, AZ (US); Krishna Dharaiya, Tempe, AZ (US); Jana Shakarian, Tempe, AZ (US); Paulo Shakarian, Tempe, AZ (US)

(73) Assignee: Arizona Board of Regents on Behalf of Arizona State University, Tempe, AZ (US)

(*) Notice: Subject to any disclaimer, the term of this patent is extended or adjusted under 35 U.S.C. 154(b) by 568 days.

(21) Appl. No.: 16/407,719

(22) Filed: May 9, 2019

(65) Prior Publication Data
US 2019/0349393 A1 Nov. 14, 2019

Related U.S. Application Data

(60) Provisional application No. 62/668,871, filed on May 9, 2018.

(51) Int. Cl.
| | |
|---|---|
| *H04L 51/00* | (2022.01) |
| *H04L 29/06* | (2006.01) |
| *G06N 20/00* | (2019.01) |
| *G06F 16/951* | (2019.01) |
| *H04L 51/046* | (2022.01) |
| *G06Q 10/06* | (2012.01) |
| *G06F 40/30* | (2020.01) |

(52) U.S. Cl.
CPC ........ *H04L 63/1433* (2013.01); *G06F 16/951* (2019.01); *G06F 40/30* (2020.01); *G06N 20/00* (2019.01); *G06Q 10/0635* (2013.01); *H04L 51/046* (2013.01)

(58) Field of Classification Search
None
See application file for complete search history.

(56) References Cited

U.S. PATENT DOCUMENTS

| | | | |
|---|---|---|---|
| 10,176,438 B2 | 1/2019 | Shakarian et al. | |
| 10,313,385 B2 | 6/2019 | Shakarian et al. | |
| 10,437,945 B2 | 10/2019 | Shakarian et al. | |
| 2018/0152402 A1* | 5/2018 | Tsou | H04L 51/12 |
| 2019/0199745 A1* | 6/2019 | Jakobsson | H04L 63/1433 |

(Continued)

FOREIGN PATENT DOCUMENTS

| | | |
|---|---|---|
| WO | 2019089389 A1 | 5/2019 |
| WO | 2019157335 A1 | 8/2019 |

OTHER PUBLICATIONS

Shakarian, Third Party Risk and Cybersecurity Part III: Threat Intelligence and Third Party Risk, LinkedIn, Jan. 16, 2018, 5 pages.
(Continued)

*Primary Examiner* — Cai Y Chen
(74) *Attorney, Agent, or Firm* — Polsinelli PC

(57) ABSTRACT

Embodiments for systems and methods for third party assessment related to the evaluation of risks associated with third parties in which hacker conversations on websites are filtered and analyzed using keywords as input to uncover relevant forum and marketplace discussions are disclosed herein.

15 Claims, 3 Drawing Sheets

(56) References Cited

U.S. PATENT DOCUMENTS

2019/0347327 A1 11/2019 Patil et al.
2019/0356956 A1* 11/2019 Sheng .............. H04N 21/25883
2020/0036743 A1 1/2020 Almukaynizi et al.

OTHER PUBLICATIONS

U.S. Appl. No. 16/548,329, Tavabi et al., filed Aug. 22, 2019.
U.S. Appl. No. 16/640,878, Shakarian et al., filed Feb. 21, 2020.
U.S. Appl. No. 16/653,899, Sarkar et al., filed Oct. 15, 2019.
U.S. Appl. No. 16/875,540, Nunes et al., filed May 15, 2020.

* cited by examiner

SYSTEMS AND METHODS FOR THIRD PARTY RISK ASSESSMENT

CROSS REFERENCE TO RELATED APPLICATIONS

This is a U.S. non-provisional patent application that claims benefit to U.S. provisional patent application Ser. No. 62/668,871 filed on May 9, 2018, which is incorporated by reference in its entirety.

FIELD

The present disclosure generally relates to computing technologies associated with third party risk assessment, and in particular a computer-implemented system and related methods for generating data defining a third party risk assessment.

BACKGROUND

Modern risk assessment may leverage various computing technologies to efficiently predict threats and associated risk. In the insurance world, whenever a person purchases insurance against a natural disaster from a provider, the provider has likely performed a very careful actuarial analysis which assesses the risk of that event occurring in that person's area and considers the likelihood of the event and the expected damages. From this analysis, the provider may derive factors such as an insurance premium and deductible. This assessment analysis may be modeled and implemented in part using a computing device.

However, conventional risk assessment analysis does not consider; e.g., "acts of God" or unnatural disasters, and other unforeseen events can break down the conventional risk assessment analysis and modeling structure. Further, advances in cyber environments have resulted in new technical problems related to computer assessment analysis. For example, cyber-attacks are generally caused by individuals who are driven by objectives they seek to achieve with available resources (including skill as well as technical equipment) in a certain amount of time. For purposes of risk assessment, this may require threats of the cyber-attack to be modeled in a different manner—one more closely tied to the use of intelligence.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Aspects of the present disclosure relate to a computer-implemented system configured to generate data defining a third party risk assessment which may be leveraged for evaluating risks associated with third parties such as suppliers, vendors, customers, joint ventures, and other external organizations. In some embodiments, a plurality of input parameters may be retrieved or otherwise accessed. These input parameters may include, by non-limiting examples, identification of third party vendors, location of third party vendors, products and services offered by the third party vendors, and any other keywords relevant to the third party vendors including employee and customer information.

In one aspect, the present system utilizes information crawled or otherwise accessed from websites on the dark web and deep web related to conversations on these websites by hackers, and this information may be leveraged to generate data defining a risk evaluation based on the dark web information and other input parameters.

Figure 1:
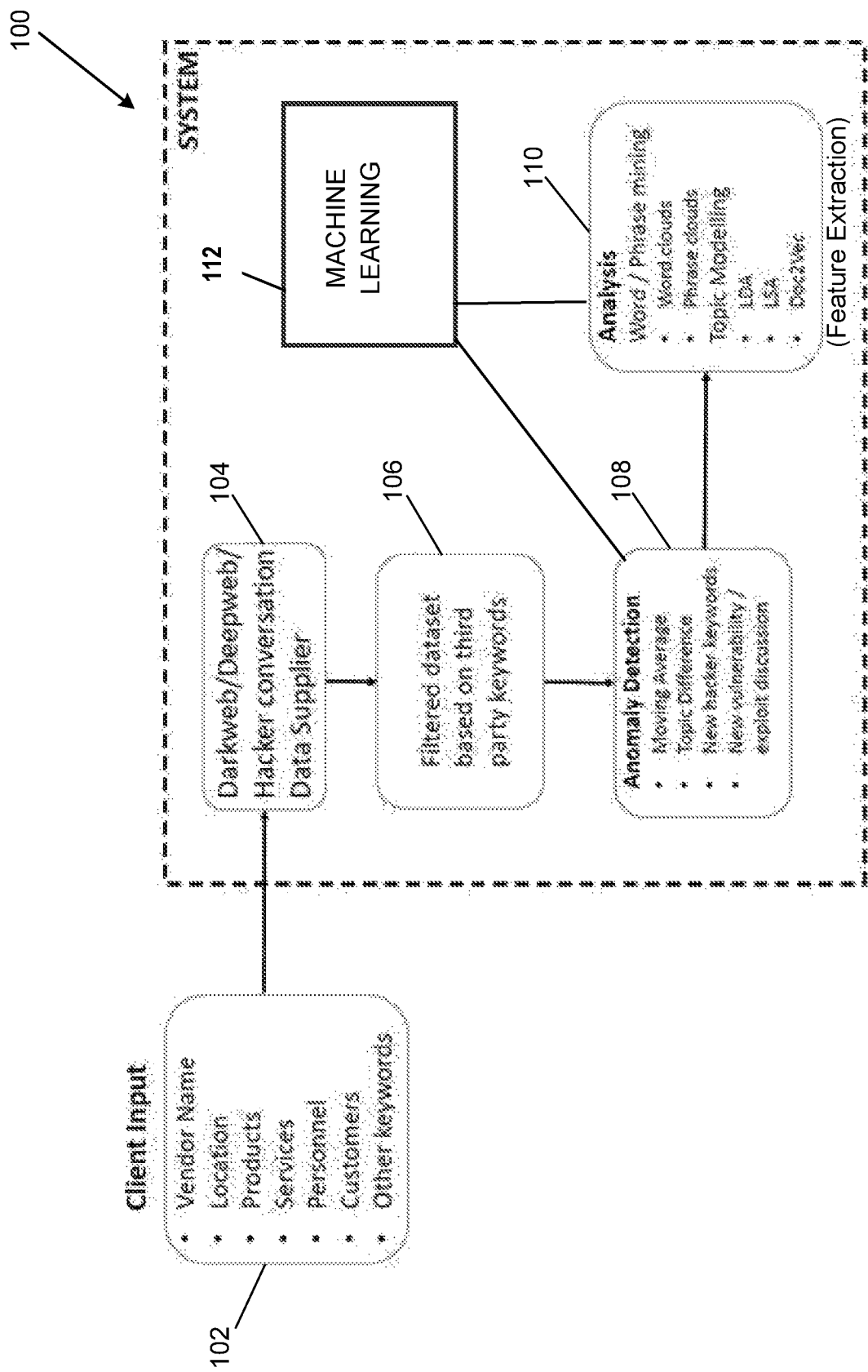
FIG. 1 is a simplified block diagram illustrating various components of a system and data flow, which may be implemented at least in part using one or more computing devices.

Referring to FIG. 1, a computer implemented risk assessment system 100 is illustrated. In general, the risk assessment system, or system 100, may define a predictive model that leverages machine learning to assess risk to a third party based on input data including conversation data that references predetermined key words in some form, and data related to increased hacker activities within the deep web. In some aspects, the system 100 may be used by, e.g., cyber insurance providers to assess risk to providing policies for insuring third parties and associated computing environments; however it should be appreciated that the concepts described may apply to other forms of computer-implemented assessment modeling and analysis. As indicated, the system 100 may include a plurality of system components (102-110) or modules, which may be implemented using one or more computing devices. The system components 102-110 may include one or more software applications, software features, modules, hardware features, or combinations thereof, in operable communication with one another via a network such as the Internet, or a cloud environment, or otherwise, e.g., aspects of the system 100 may take the form of software features and logic (e.g., application 150 of FIG. 2) executed by a computing device (200 of FIG. 2). System component 102 is configured for accessing input parameters and/or "Client Input", which may be retrieved from a device associated with a third party, or otherwise accessed. The input parameters may include, for example, identifying information, such as the names of the third-party vendors, locations, products and services offered by the vendors and any other keywords relevant to the vendors, such as employee and customer information. By way of example, input parameters may include an entity name such as "Company A," and an executive of Company A, "Executive John Doe." The input parameters may include any fields or information suitable for identifying an entity or entity-related information or concepts based on analysis of data associated with deep web Internet activity, as further described herein.

In some embodiments, the input parameters may further include predetermined third party keywords. These predetermined third party keywords may be determined in advance by the third party or the party assessing risk to the third party, and may define key sensitive or security-related concepts, such as operationally critical hardware/software, possible vulnerabilities, or any terms that may be referenced by hackers in the context of a possible attack to the third party. As one example, a third party keyword may define a computing product associated with Company A such as "Email Server." In this example, it may be desirable to determine whether hackers have engaged in conversations around the Email Server of Company A, and to what extent, in order to assess the possibility of an attack involving the Email server, as further elaborated upon herein.

As indicated in FIG. 1, the system 100 may include system component 104. System component 104 may involve the compilation, collection, aggregation, or access of one or more datasets (in the form of documents or otherwise) associated with dark web or deep web websites. Accordingly, the system component 104 may include crawlers, or spider programs for generating the datasets from the deep web. In some embodiments, the datasets may relate to hacker conversations, which may be accessed from forums of the deep web, or through online discussions generated within an online marketplace. In some embodiments, the risk assessment system 100 may receive the subject dataset of system component 104, such as filtered a hacker conversation, from a device associated with a data supplier.

The system 100 may further include system component 106. System component 106 may include preprocessing, or filtering the dataset of system component 104 based on the predetermined third party keywords. In some embodiments, this may include filtering hacker conversations based on predetermined third party keywords. As previously described, third party keywords may include any number of terms related to risks or possible changes to a computing environment. For example, a third party keyword may be "deployment" which may indicate that a computing environment A is preparing to deploy a new hardware or software feature. This third party keyword may be useful for assessing risk to the computing environment A, as further described herein.

In some embodiments, the dataset may further be subjected to any number of preprocessing steps or parsing steps, which may be useful for extracting information related to the third party keywords, or filtering the dataset based on the third party keywords. For example, preprocessing may involve eliminating non-English content, tokenizing the data, removing stop words, and applying stemming and lemmatization processes to the dataset. In some aspects the dataset may define a number of documents (e.g., HTML) accessed from the deep web. The total documents may be filtered to a subset of the documents that includes hacker conversations, topics, or other information related to the predetermined third party keywords. In some embodiments, the documents may include predetermined information of interest, such as fields including a topic title, topic content, post content, topic author, post author, author reputation, posted date for each title and posts, etc. These fields may be leveraged to filter the datasets and each of the fields may be searched for presence of one or more of the third party keywords.

In addition, the risk assessment system 100 may include system component 108 configured for anomaly detection. More specifically, in some embodiments, the system 100 computes anomalies in the filtered hacker conversations referenced with system component 106 to detect any spikes in hacker discussions using moving average, differences in topics discussed in an industry vertical, new keywords utilized by hackers not previously present in the input over a time interval (which can be a month, quarter or year according to client's needs). These anomalies often indicate increased interest in the third party products and services. This interest could be discussions of vulnerabilities discovered in the products/services and malicious code to exploit those vulnerabilities, data leaks from third parties compromising customer information of the client or it could just be non-harmful discussions regarding the third party. Continuing with the exemplary keyword from system component 106 above, the system component 108 may be used to indicate an increase in discussion amongst hackers related to "deployment" associated with the computing environment A. This may be computed as an anomaly, and may be used to predict an attack or risk to the computing environment A based on the deployment. In some embodiments, anomalies detected may be translated to a numerical value, which may be useful for weights applied to machine learning, as further described herein.

Continuing with FIG. 1, the risk assessment system 100 may include a system component 110 for analysis of the filtered data of system 106 and feature extraction. In this component, the system 100 cleans any relevant hacker discussions (forum posts and marketplace items) to remove any stop words or non-alphanumeric characters to better present the results in order to generate analysis in terms of word clouds, phrase clouds, modeling topics. In addition, the system component 110 may further be used to generate numerical features from textual data of the dataset; e.g., derive numerical values from conversations between hackers as extracted from deep web conversations memorialized in web documents in HTML or otherwise (using different methods such as LDA, LSA, Doc2vec etc.). The features generated may include one or more vectors, matrices, and the like. Feature extraction, or feature learning, may include both supervised and/or supervised methods.

In addition, the system 100 may include system component 112. In general, the system component 112 takes the dataset and other information about the hacker conversations from the deep web, and applies this information to at least one machine learning algorithm to output a value that may be used to assess risk. In some embodiments, system component 112 may take features defined in system component 110, and apply the features to one or more machine learning algorithms, such as a classifier, to ultimately generate a class or score which may be used to assess risk to the third party. Any number of machine learning algorithms may be employed, such as supervised and semi-supervised learning, unsupervised learning, and reinforcement learning. In some embodiments, the hacker conversations, or conversation data, may define topics that may be classified. For example, let X be a set of forum topics, $y=\{0,1\}^k$ let k be possible tags and D be an unknown distribution on the product space X×Y. Each element (x, y) in this space is composed of an instance x and a label vector y, which is a vector of indicators $y=[y_1, \ldots, y_k]$ that specifies classes associated with x. A classifier is a function h: X→Y, that maps instance x to a label vector y=h(x). For example, the sample forum topic "Company A new deployment" may belong to two classes—"vuln", indicating a vulnerability "oper" indicating that the Company A's new deployment is related to operations for maintaining the underlying business.

The present system 100 may leverage data crawled from a dataset of a plurality of cyber security related online forums. From the collected html pages or documents of the dataset, the present system may parse predetermined important fields from the data such as topic title, posts, user name, title posted date, user ratings, number of replies, etc. A machine learning model may then be constructed that applies labels such as "high risk" or "low risk" to forum topics associated with a third party.

The machine learning model may apply labels to forum topics or conversations associated with a third party by analyzing the context in which certain keywords appear within a conversation. Rather than simply assigning a "high risk" label to a conversation in which a high number of keywords are found, the machine learning model may look at the context surrounding the words. In some embodiments, the model Doc2Vec may be used for this purpose. Doc2Vec involves analyzing a set of documents, generating a document vector for each document, and generating a word vector for each word contained within each document. A set of weights are assigned to each vector to ultimately calculate the weight of the entire document. In this context, a Doc2Vec model may assign a document vector to a set of conversations found on the deep web and a word vector to each word contained within those conversations. A word identified as a predetermined third party keyword may be given a higher weight. Each vector may then be used to find similarities between sentences and paragraphs within each conversation. Conversations with higher rates of similarity are then assigned a higher weight and are thus deemed to be "high risk". Other machine learning models may be employed to achieve similar results.

Figure 2:
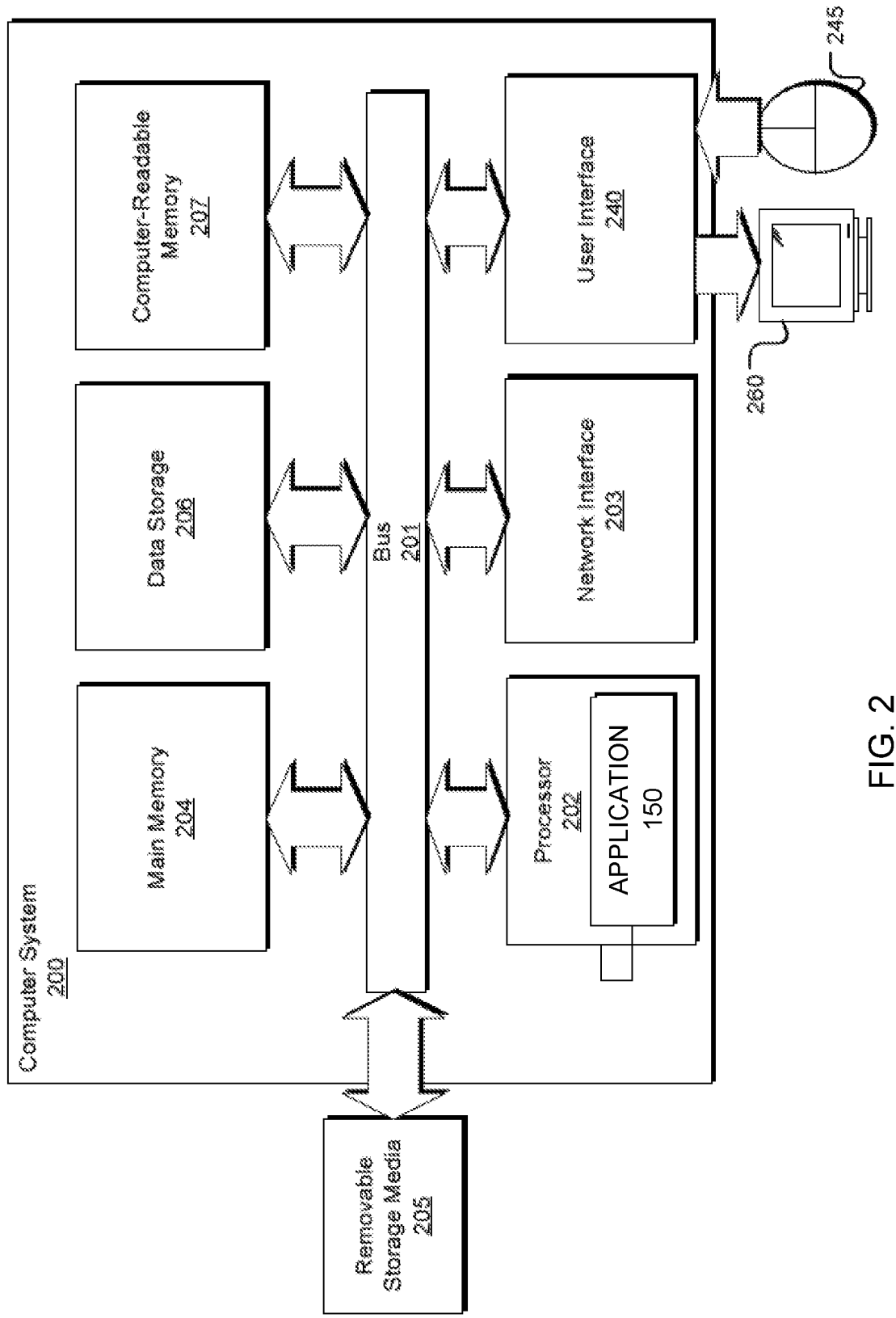
FIG. 2 is a simplified block diagram of an exemplary computing device for effectuating functionality described herein.

Computing Device for Implementing the System 100 or Executing Operations Thereof FIG. 2 illustrates an example of a suitable computing device and networking which may be used to implement various aspects of the risk assessment system 100. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules 212 at different times. Software may accordingly configure a processor 202, for example, to constitute a particular hardware-implemented module at one instance of time and to constitute a different hardware-implemented module at a different instance of time.

Hardware-implemented modules 212 may provide information to, and/or receive information from, other hardware-implemented modules 212. Accordingly, the described hardware-implemented modules 212 may be regarded as being communicatively coupled. Where multiple of such hardware-implemented modules 212 exist contemporaneously, communications may be achieved through signal transmission (e.g., over appropriate circuits and buses) that connect the hardware-implemented modules. In embodiments in which multiple hardware-implemented modules 212 are configured or instantiated at different times, communications between such hardware-implemented modules may be achieved, for example, through the storage and retrieval of information in memory structures to which the multiple hardware-implemented modules 212 have access. For example, one hardware-implemented module 212 may perform an operation, and may store the output of that operation in a memory device to which it is communicatively coupled. A further hardware-implemented module 212 may then, at a later time, access the memory device to retrieve and process the stored output. Hardware-implemented modules 212 may also initiate communications with input or output devices.

As illustrated, the computing and networking environment 200 may be a general purpose computing device 200, although it is contemplated that the networking environment 200 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device 200 may include various hardware components, such as a processing unit 202, a main memory 204 (e.g., a system memory), and a system bus 201 that couples various system components of the general purpose computing device 200 to the processing unit 202. The system bus 201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The general purpose computing device 200 may further include a variety of computer-readable media 207 that includes removable/non-removable media and volatile/nonvolatile media, but excludes transitory propagated signals. Computer-readable media 207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device 200. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 204 includes computer storage media in the form of volatile/nonvolatile memory such as read only memory (ROM) and random access memory (RAM). A basic input/output system (BIOS), containing the basic routines that help to transfer information between elements within the general purpose computing device 200 (e.g., during start-up) is typically stored in ROM. RAM typically contains data and/or program modules that are immediately accessible to and/or presently being operated on by processing unit 202. For example, in one embodiment, data storage 206 holds an operating system, application programs, and other program modules and program data.

Data storage 206 may also include other removable/non-removable, volatile/nonvolatile computer storage media. For example, data storage 206 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 200.

A user may enter commands and information through a user interface 240 or other input devices 245 such as a tablet, electronic digitizer, a microphone, keyboard, and/or pointing device, commonly referred to as mouse, trackball or touch pad. Other input devices 245 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 245 are often connected to the processing unit 202 through a user interface 240 that is coupled to the system bus 201, but may be connected by other interface and bus structures, such as a parallel port, game port or a universal serial bus (USB). A monitor 260 or other type of display device is also connected to the system bus 201 via a user interface 240, such as a video interface. The monitor 260 may also be integrated with a touch-screen panel or the like.

The general purpose computing device 200 may operate in a networked or cloud-computing environment using logical connections of a network Interface 203 to one or more remote devices, such as a remote computer. The remote computer may be a personal computer, a server, a router, a network PC, a peer device or other common network node, and typically includes many or all of the elements described above relative to the general purpose computing device 200. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device 200 may be connected to a public and/or private network through the network interface 203. In such embodiments, a modem or other means for establishing communications over the network is connected to the system bus 201 via the network interface 203 or other appropriate mechanism. A wireless networking component including an interface and antenna may be coupled through a suitable device such as an access point or peer computer to a network. In a networked environment, program modules depicted relative to the general purpose computing device 200, or portions thereof, may be stored in the remote memory storage device.

Figure 3:
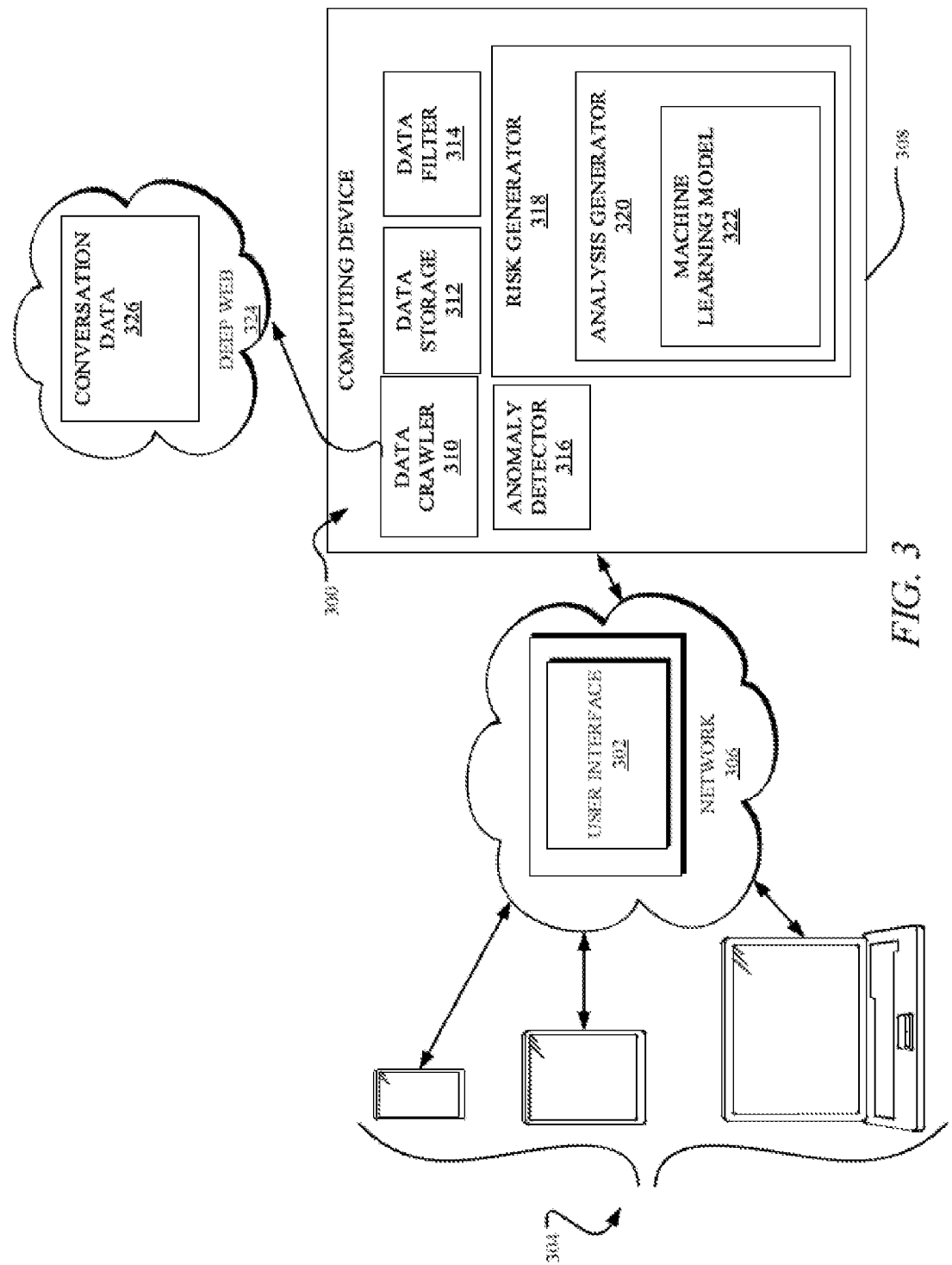
FIG. 3 is a simplified block diagram for illustrating an exemplary computing network configured to employ a third party risk assessment system.

FIG. 3 is a network system 300 for illustrating a computing network that may be configured to implement a third party risk assessment system. The third party risk assessment system may be generally comprised of one or more computing devices configured with aspects of the functional and computational systems described herein. In other words, the aforementioned computations for generating a third party risk assessment can be translated to computing code and installed to one or more computing devices, thereby configuring such computing devices with functionality for generating a third party risk assessment.

In some embodiments, the network environment of the third party risk assessment system may include a plurality of user devices 304. The user devices 304 may access a user interface 302 which may generally embody features of the third party risk assessment system and makes at least some of the features accessible to the user devices 304 via a network 306. In some embodiments, the user interface 302 is executed and generally managed by a computing device 308 such as a server, or SaaS (Software as a service) provider in a cloud. The computing device 308 is configured to execute aspects of the third party risk assessment system. In some embodiments, a data crawler 310 may access and collect conversation data 326 hosted on the deep web 324. In other embodiments, a data supplier is used instead of the data crawler 310. The collected data may be stored in a data storage system 312 and then filtered through a data filter 314 according to a number of predetermined keywords. An anomaly detector 316 may then detect any anomalies in the data. The computing device 308 may be further configured to execute a risk generator 318 that can be employed to analyze the data and calculate a third party risk assessment. The risk generator 318 may utilize an analysis generator 320 that uses one of a variety of possible machine learning models 322. The machine learning models 322 may include LDA, LSA, and Doc2Vec. The user devices 304 may be generally any form of computing device capable of interacting with the network 306 to access the application 302 and implement the third party risk assessment system, such as a mobile device, a personal computer, a laptop, a tablet, a work station, a smartphone, or other internet-communicable device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for generating data defining a third party risk assessment, comprising;
    configuring a computing device with instructions for executing operations comprising:
        accessing input data related to a third party, wherein the input data includes a set of keywords relevant to the third party;
        filtering conversation data from a website to select portions of the conversation data which include at least one of the set of keywords relevant to the third party;
        detecting anomalies in the conversation data that indicate a spike in discussions relevant to the third party; and
        generating a third party risk assessment for the third party based on the anomalies in the conversation data.

2. The method of claim 1, wherein the input data related to the third party includes a name of the third party, a location of the third party, a type of service offered by the third party, and a type of product offered by the third party.

3. The method of claim 1, wherein the third party is a supplier, a vendor, a customer, a joint venture, or an external organization.

4. The method of claim 1, wherein the anomalies in the conversation data are computed using a moving average, differences in a plurality of topics discussed in an industry vertical, and a collection of new keywords not previously present in the input data over a time interval.

5. The method of claim 1, wherein the conversation data is cleaned to remove stop words or non-alphanumeric characters.

6. The method of claim 1, wherein the website is hosted on either the dark web or deep web.

7. The method of claim 1, wherein the conversation data is collected from a conversation held by a hacker.

8. The method of claim 1, further comprising generating the third party risk assessment for the third party based on the anomalies in the conversation data by analyzing mined word clouds and mined phrase clouds, and by topic modeling.

9. The method of claim 1, wherein the anomalies in the conversation data are discussions of vulnerabilities discovered in a product sold by the third party, malicious code designed to exploit a vulnerability discovered in a product sold by the third party, a data leak from the third party that comprises customer information of the client, and any discussion regarding the third party.

10. The method of claim 1, further comprising receiving conversation data from a data supplier.

11. A system for generating data defining a third party risk assessment, comprising:
    a processor in communication with a tangible storage medium storing instructions that are executed by the processor to perform operations comprising:
        accessing input data related to a third party, wherein the input data includes a set of keywords relevant to the third party;
    filtering through a data filter conversation data from a website to select portions of the conversation data which include at least one of the set of keywords relevant to the third party;
        detecting anomalies in the conversation data that indicate a spike in discussions relevant to the third party; and
        generating with a risk generator a third party risk assessment for the third party based on the anomalies in the conversation data.

12. The system of claim 11, wherein the website hosting the conversation data is deep web based.

13. The system of claim 11 further comprising a data crawler configured to crawl deep web based websites to collect the conversation data.

14. The system of claim 11, wherein the risk generator generating the third party risk assessment employs a machine learning model.

15. The system of claim 11, wherein the conversation data is received from a data supplier.

* * * * *